| United States Patent [19] | [11] | 4,102,847 |
|---|---|---|
| Hartmann et al. | [45] | Jul. 25, 1978 |

[54] BAKING FINISHES OF LOW SOLVENT CONTENT

[75] Inventors: Heinrich Hartmann, Limburgerhof; Hans Sander, Ludwigshafen, both of Fed. Rep. of Germany

[73] Assignee: BASF Aktiengesellschaft, Ludwigshafen, Fed. Rep. of Germany

[21] Appl. No.: 713,785

[22] Filed: Aug. 12, 1976

[30] Foreign Application Priority Data

Sep. 3, 1975 [DE] Fed. Rep. of Germany ....... 2539104

[51] Int. Cl.² .............................................. C08K 5/10
[52] U.S. Cl. .................... 260/31.4 R; 260/33.4 UR; 260/33.6 UB; 260/37 N; 260/29.1 SB; 260/39 R
[58] Field of Search ................. 260/850, 851, 31.4 R, 260/33.6 UB

[56] References Cited

U.S. PATENT DOCUMENTS

| 3,331,887 | 7/1967 | Wakasa et al. ...................... 260/850 |
|---|---|---|
| 3,491,067 | 1/1970 | Sellet ..................................... 260/851 |
| 3,557,043 | 1/1971 | Krauss et al. ........................ 260/851 |
| 3,660,327 | 5/1972 | Loncrini et al. ..................... 260/850 |
| 3,759,873 | 9/1973 | Hudak .................................. 260/850 |
| 3,947,528 | 3/1976 | Wingler et al. ...................... 260/851 |
| 3,959,201 | 5/1976 | Chang .................................. 260/851 |
| 3,962,521 | 6/1976 | Chang et al. ........................ 260/850 |
| 3,980,732 | 9/1976 | Isaksen et al. ...................... 260/850 |

*Primary Examiner*—Lewis T. Jacobs
*Attorney, Agent, or Firm*—Keil, Thompson & Shurtleff

[57] ABSTRACT

Baking finishes of low solvent content, which have a viscosity of from 20 to 300 DIN seconds, measured in a DIN cup No. 4, and comprise from 40 to 85% by weight of hydroxyl-containing polymers, from 10 to 55% by weight of amine/formaldehyde resins and from 5 to 35% by weight of polyisocyanates, and may also contain up to 15% by weight of monohydric or dihydric alcohols, up to 35% by weight of solvents, up to 65% by weight of pigments and fillers and up to 3% by weight of crosslinking catalysts. The finishes are particularly suitable for coating automotive components.

26 Claims, No Drawings

BAKING FINISHES OF LOW SOLVENT CONTENT

The present invention relates to crosslinkable coating compositions of high solids content, based on hydroxyl-containing polymers and a combination of amine/formaldehyde resins and polyisocyanates as crosslinking agents.

Coating compositions of low solvent content, comprising hydroxyl-containing polymers and polyisocyanates as crosslinking agents, have been disclosed. Because of their high polyisocyanate content, such finishes are rather expensive. To be processable under industrial conditions, e.g. by spraying, they must have a relatively low viscosity. This is achieved by adding low molecular weight alcohols as reactive thinners. As a result, the hydroxyl number of the system is greatly increased, which in turn makes it necessary to increase the amount of polyisocyanate.

Amine/formaldehyde resins can be used as crosslinking agents as an alternative to polyisocyanates. However, such finishes have unsatisfactory mechanical properties; for many applications, the coatings are too brittle and they are furthermore very sensitive to underbaking and overbaking; if the temperature used is even slightly below or above the optimum baking temperature, the coatings obtained are either too soft or too brittle.

It is an object of the present invention to provide relatively inexpensive baking finishes of low solvent content, which have a low viscosity and are therefore readily sprayable, and give hard, resistant coatings having good mechanical properties.

We have found that this object is achieved by providing baking finishes of low solvent content which are based on a mixture of hydroxyl-containing polymers, amine/formaldehyde resins and polyisocyanates, and which comprise A. from 40 to 85% by weight of hydroxyl-containing polymers,
B. from 10 to 55% by weight of amine-formaldehyde resins,
C. from 5 to 35% by weight of one or more aliphatic and/or cycloaliphatic polyisocyanates, preferably a derivative of hexymethylenediisocyanate, such as tris-(isocyanatohexyl)-biuret or a mixture of tri-(isocyanatohexyl)-isocyanurate with bis-(isocyanatohexyl)-uretdione or a polyisocyanate, containing biuret groups, which has been manufactured by reacting hexamethylenediisocyanate with 3,3'-dimethyl-4,4'-diaminodicyclohexylmethane,
D. from 0 to 15% by weight of monohydric or dihydric alchohols,
E. from 0 to 35% by weight of solvents,
F. from 0 to 65% by weight of pigments and fillers and
G. from 0 to 3% by weight of crosslinking cataysts, the sum of the percentages of A, B and C being 100, and the viscosity of said finishes being from 20 to 300 DIN seconds, measured in a DIN cup No. 4 (in accordance with DIN 53,211).

The following further details with regard to the individual components should be noted:
A. Component A is a hydroxyl-containing polymer, preferably having a hydroxyl number of from 60 to 400 and especially from 80 to 300. It is possible to use hydroxyl-containing polyacrylates, polyesters, alkyd resins or castor oil, or their mixtures. Hydroxyl-containing polyacrylates having molecular weights of from 1,000 to 3,000 are particularly preferred, especially copolymers of (a) from 10 to 90% by weight of an ester of acrylic acid or methacrylic acid with a monohydric aliphatic alcohol of 1 to 8 carbon atoms,
(b) from 10 to 50% by weight of a monoester of acrylic acid or methacrylic acid with an aliphatic polyhydric alcohol of 2 to 8 carbon atoms,
(c) from 0 to 60% by weight of a vinyl-aromatic or isopropenyl-aromatic of 8 to 14 carbon atoms and
(d) from 0 to 20% by weight of other olefinically unsaturated monomers.

The preferred copolymers consist of:
(a) From 10 to 90% of an ester of acrylic acid or methacrylic acid with a monohydric aliphatic alcohol of 1 to 8 carbon atoms, e.g. n-butyl acrylate or methacrylate, ethyl acrylate, methyl methacrylate, ethylhexyl acrylate and isooctyl acrylate. n-Butyl acrylate and tert.-butyl acrylate are particularly preferred.
(b) From 10 to 40% of a monoester of acrylic acid or methacrylic acid with an aliphatic polyhydric alcohol of 2 to 8 carbon atoms, i.e. esters of aliphatic polyols, preferably diols, in which only one hydroxyl group is bonded to the acrylyl or methacrylyl radical. Preferred compounds of this type are ethylene glycol monoacrylate and monomethacrylate, butane-1,4-diol monoacrylate and 2-hydroxypropyl acrylate.
(c) From 0 to 50% of a vinyl-aromatic or isopropenyl-aromatic of 8 to 14 carbon atoms. Suitable compounds of this type are styrene, α-methylstyrene and vinyltoluenes, e.g. p-vinyltoluene. Styrene is particularly preferred.
(d) From 0 to 20% of other olefinically unsaturated monomers. Examples of suitable monomers of this type are vinyl esters of alkanemonocarboxylic acids of 2 to 5 carbon atoms, e.g. vinyl acetate or vinyl propionate, and nitriles of olefinically unsaturated carboxylic acids, e.g. acrylonitrile or methacrylonitrile; small amounts, e.g. up to 3%, of α,β-monoolefinically unsaturated monocarboxyic acids and/or dicarboxylic acids, e.g. acrylic acid or fumaric acid, may also be present as copolymerized units.

Copolymers which contain from 50 to 90% by weight of tert.-butyl acrylate as copolymerized units exhibit a particularly advantageous low viscosity coupled with a relatively high softening point.

The acrylic ester polymers A can be manufactured in the absence of solvents, by polymerization in the presence of catalysts which form free radicals, e.g. azo-bis-carboxylic acid amides or azo-bis-carboxylic acid nitriles, e.g. azodiisobutyronitrile, or of peroxides, e.g. tert.-butyl peroxide, at from 80° to 160° C, preferably from 110° to 140° C, in the presence or absence of conventional regulators. Examples of suitable regulators, which are generally employed in amounts of from 0.5 to 8% by weight, preferably from 3 to 6% by weight, based on the monomers, are tert.-dodecylmercaptan or n-dodecylmercaptan, thioethanol or diisopropylxanthogen disulfide. The polymerization is preferably carried out at least periodically under reduced pressure, in most cases at from 200 to 800 mbar, preferably from 400 to 600 mbar, and advantageously with evaporative cooling, i.e. with reflux of the monomer and, where, appropriate, the solvent.

A further possible method of preparing the acrylic ester copolymers is to carry out the polymerization in the presence of an inert organic solvent in the conventional manner, i.e. without evaporative cooling, the solvent subsequently being removed entirely or partially. Solvents which may be used in this process are the organic solvents conventionally employed in the surface coating industry, which should also be inert to isocyanates. Examples of suitable solvents are esters, e.g. ethylglycol acetate, or aromatic hydrocarbons, e.g. xylene or toluene. It is also possible, and in some cases even advantageous, to manufacture the acrylic ester polymer A in the presence of the alcohols D.

Particularly suitable copolymers A have molecular wieghts of less than 2,000, softening ranges of less than 80° C and preferably less than 60° C, K values, measured by the method of H. Fikentscher, Cellulosechemic 13 (1932), 58 (on a 2% strength solution in dimethylformamide) of less than 20, preferably less than 16, and viscosities of less than 40 seconds in a DIN 53,211 4 mm flow cup, measured on a 50% strength solution in ethylglycol acetate.

Further very suitable copolymers are hydroxyl-containing polyesters, especially with molecular weights of from 250 to 1,000, manufactured by conventional melt condensation from saturated dicarboxylic acids or their derivatives, aliphatic dihydric alcohols and/or aliphatic trihydric to pentahydric alcohols.

Examples of suitable dicarboxylic acids are phthalic acid, isophthalic acid, terephthalic acid, tetrahydrophthalic acid, hexahydrophthalic acid, oxalic acid and adipic acid. Phthalic acid, phthalic anhydride and adipic acid are particularly suitable.

Examples of suitable diols are ethylene glycol, propylene glycol, butanediol, hexanediol and neopentylglycol. Ethylene glycol is preferred.

Examples of suitable polyhydric alcohols are glycerol, trimethylolpropane, hexanetriol, trimethylolethane and pentaerythritol. Trimethylolpropane is preferred.

The polyesters are liquids of relatively high viscosity, or soft resins.

The component A is present in the baking finishes of the invention in amounts of from 40 to 85% by weight, preferably from 50 to 70% by weight.

B. Component B is an amine/formaldehyde resin, preferably an at least partially etherified precondensate of formaldehyde and melamine or urea. Fluid, solvent-free products are particularly suitable in order to allow finishes of high solids content to be applied easily. However, the conventional amine/formaldehyde resins containing solvents may also be used. Other triazines, triazoles, diazines, guanidines or guanamines, e.g. N,N'-dimethylurea, acetylenediurea, dicyandiamide, benzoguanamine or alkyl-substituted melamines may also be employed as the amines. At least some, and preferably all, alkylol groups of the pre-condensates are etherified. Any desired alcohol may be used for the etherification, e.g. methanol, ethanol, propanol, n-butanol or benzyl alcohol. The amine/formaldehyde resin is manufactured in a known manner by acid-catalyzed condensation, preferably using aqueous formaldehyde. Details are to be found, for example, in Houben-Weyl, "Methoden der organischem Chemie," (1963), volume 14/2, pages 319 et seq.

The component B is present in amounts of from 10 to 55% by weight, preferably from 15 to 35% by weight.

C. Component C is a polyisocyanate. It is possible to use, for example, aliphatic and/or cycloaliphatic polyisocyanates, which are obtainable by conventional methods from cycloaliphatic/aliphatic diisocyanates, e.g. 3-isocyanatomethyl-3,5,5-aminoethylcyclohexylisocyanate or aliphatic diisocynates, e.g. 2,2,4-trimethylhexamethylenediisocyanate, 2-nonyldecamethylenediiscyanate, 1-methyl-2,4-diisocyanatocyclohexane or diisocyanatecyclohexane. Preferred aliphatic or cycloaliphatic polyisocyanates are, for example, derivatives of hexamethylenediisocyanate, such as tris-(isocyanatohexyl)-biuret or a mixture of tri-(isocyanatohexyl)-isocyanurate with bis-(isocyanatohexyl)-uretdione or a polyisocyanate, containing biuret groups, which has been manufactured by reacting hexamethylenediisocyanate with 3,3'-dimethyl-4,4'-diaminodicyclohexylmethane.

Component C is present in amounts of from 5 to 35% by weight, preferably from 10 to 30% by weight.

D. Component D is a monohydric or dihydric alcohol which can be used optionally as a reactive thinner for lowering the viscosity of the system. The alcohol reacts, during baking, with the crosslinking agents and is thus chemically built into the coating. It should preferably not be volatile under the baking conditions and its boiling point is therefore preferably above 120° C and especially above 150° C. Monohydric and dihydric saturated aliphatic alcohols with molecular weights of less than 200, e.g. butane-1,4-diol, 2-ethylhexanol, ethylene glycol, propanediol, butyldiglycol or neopentylglycol, are preferred. Ester-diols which have a molecular weight of from 204 to 500 and contain one ester group and two hydroxyl groups are also suitable. A preferred ester-diol is hydroxypivalic acid neopentylglycol ester. Other ester-diols are disclosed in German Laid-Open Applications DOS 25 00 310, 25 00 311 and 25 00 312. They have the general formula

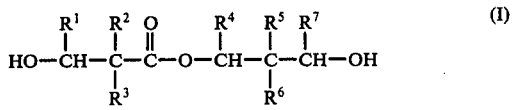

where $R^1$ to $R^7$ are hydrogen or alkyl of 1 to 4 carbon atoms and $R^2$ may also be joined to $R^3$, and $R^5$ to $R^6$, to form a cycloalkyl ring of 5 to 8 carbon atoms, provided that amongst the groups $R^1$ to $R^3$, on the one hand, and $R^4$ to $R^7$, on the other, in each case at least two groups are alkyl.

Component D may be present in amounts of from 0 to 15% by weight, preferably from 0 to 10% by weight. In order to save isocyanate, it is desirable to keep this amount as low as possible.

E. Component E is a solvent. In some cases it may be advantageous or necessary to add, to the baking finish, solvents which are removed from the finish during baking. They essentially also serve to lower the viscosity; in some cases they are introduced into the finish by acting as solvents for other additives. In order to protect the environment, their amounts should also be kept as low as possible. Examples of suitable solvents are n-butyl acetate, ethylglycol acetate, methyl ethyl ketone or xylene. Inert solvents are preferred, but it is also possible to use low-boiling alcoholic solvents, without significantly interfering with the crosslinking reaction. The other conventional additives for surface coatings should also be mentioned at this juncture, for example cellulose esters, flow control agents, plasticizers, silicone oils or thixotropic agents.

Component E may be present in amounts of from 0 to 35% by weight, preferably from 0 to 25% by weight and especially from 5 to 20% by weight.

F. Component F comprises conventional pigments and fillers, e.g. titanium dioxide, carbon black, organic or inorganic colored pigments, talc or baryte. These may be present in amounts of from 0 to 65% by weight, preferably from 0 to 50% by weight.

G. Component G comprises crosslinking catalysts, firstly for the condensation of the hydroxyl groups of component A with the methylol ether groups of component B and secondly for the addition of the hydroxyl groups to the isocyanate groups of component C. Examples of suitable catalysts are, on the one hand, organic sulfonic acids, e.g. p-toluenesulfonic acid and, on the other, organic tin compounds, e.g. dibutyl-tin dilaurate. Component C is present in amounts of from 0 to 3% by weight, preferably from 0 to 1.0% by weight.

The baking finishes of the invention are, in general, two-component systems. The polyisocyanate C and a mixture of the other components are stored separately and are mixed with one another before the finish is applied. The reaction mixture can be kept for from several hours to several days, without crosslinking occurring at room temperature.

The viscosity of the baking finishes is from 20 to 300, preferably from 30 to 100, DIN seconds. The coating compositions of the invention may be applied to any desired bases, e.g. metal, wood, ceramics and plastics, by conventional methods, e.g. by spraying, brushing, pouring, roller application or dipping. The finishes are particularly suitable for coating automotive components.

The curing of the coating compositions on the base is in general carried out at from 80° to 180° C, preferably from 120° to 150° C. It requires — depending on the curing temperature — from 10 to 120 minutes and especially from 20 to 40 minutes.

In the Examples, parts and percentages are by weight.

EXAMPLE 1

An acrylate resin is manufactured by solution polymerization of 35% of hydroxypropyl acrylate, 55% of tert.-butyl acrylate and 10% of n-butyl acrylate. The resin (as a 79% strength solution in ethylglycol acetate) has a K value of 14 (as a 2% strength solution in dimethylformamide), a molecular weight of about 1,300, a hydroxyl number of 150 (based on solid resin) and a viscosity of 1,850 mPas at 50° C.

104 parts of the acrylate resin (79% strength) are pigmented with 119.7 parts of titanium dioxide. 18.6 parts of a solvent-free methanol-etherified melamine/formaldehyde resin, 19.6 parts of a mixture of a polyisocyanate, containing biuret groups, which has been manufactured by reacting hexamethylenediisocyanate and 3,3-dimethyl-4,4-diaminodicyclohexylmethane and has an isocyanate content of 23.5%, 53 parts of ethylglycol acetate and 0.18 part of p-toluenesulfonic acid (20% strength in butyl acetate) is added. The surface coating solution has a viscosity of 99 seconds in a DIN cup No. 4 and a solids content of 79.2%.

A surface-coating film 75 μ thick was produced by baking for half an hour at 150° C. It had the following properties:

König pendulum hardness (DIN 53,157): 120 seconds.
Erichsen value (DIN 53,156): 8.1.
Gardner gloss (ASTM D 523/67): 74.
Cross-hatch test (DIN 53,151): 0.
Bending test and scratch resistance: satisfactory.

EXAMPLE 2

87.5 parts of the polyacrylate described in Example 1 are pigmented with 120 parts of titanium dioxide. 30.9 parts of melamine/formaldehyde resin as described in Example 1, 19.6 parts of polyisocyanate as described in Example 1, 62 parts of ethylglycol acetate and 1.5%, based on the melamine resin, of p-toluenesulfonic acid are added.

The surface-coating solution has a viscosity of 69 seconds and a solids content of 78.7%.

A 72 μ thick surface-coating film was produced by baking for half an hour; it had the following properties:
Gloss: 87.
Pendulum hardness: 104 seconds.
Erichsen value: 7.1.
Bending test and scratch resistance: satisfactory.

EXAMPLE 3

122 parts of acrylate resin as described in Example 1 are pigmented with 120 parts of titanium dioxide. 30.9 parts of tetrabutoxymethyl acetylenediurea, 47 parts of ethylglycol acetate, 2.5,% based on the urea derivative, of p-toluenesulfonic acid and 19.6 parts of polyisocyanate as described in Example 1 are added.

A surface-coating 60 μ thick was produced by baking for half an hour at 140° C. It had the following properties:
Levelling: very good.
Gloss: 80.
Pendulum hardness: 151 seconds.
Erichsen value: 7.7.
Bending test and scratch resistance: satisfactory.

EXAMPLE 4

88.7 parts of the acrylate resin described in Example 1, 18.6 parts of melamine/formaldehyde resin described in Example 1 and 12 parts of ester-diol 260 (2-methyl-2-propyl-propane-1,3-diol mono-(2-methyl-2-propyl-3-hydroxypropionate) are pigmented with 120 parts of titanium dioxide. 19.6 parts of tris-isocyanatohexyl-biuret (having an isocyanate content of 23.5%), 46 parts of ethylglycol acetate and 0.2%, based on the melamine resin, of p-toluenesulfonic acid are added.

The surface-coating solution has a viscosity of 88 seconds and a solids content of 80.8%.

A surface-coating film 64 μ thick was produced by baking for half an hour at 160° C. It had the following properties:
Levelling: very good.
Gloss: 84.
Pendulum hardness: 154 seconds.
Erichsen value: 6.0.
Bending test and scratch resistance: satisfactory.

EXAMPLE 5

(a) 87.5 parts of acrylate resin as described in Example 1 are pigmented with 120 parts of titanium dioxide. After adding 52.6 parts of melamine/formaldehyde resin etherified with n-butanol (57% strength in xylene/butanol), 19.5 parts of polyisocyanate as described in Example 1 and 46 parts of ethylglycol acetate, a surface-coating solution haing a solids content of 75% and a viscosity of 80 seconds is obtained.

A surface-coating film 74 μ thick was produced by heating for half an hour at 130° C. It had the following properties:
Levelling: very good.
Gloss: 82.
Pendulum hardness: 126 seconds.
Erichsen value: 6.1. p1 Cross-hatch test: 0.
Bending test: satisfactory.

(b) Example 5a is repeated, but without adding polyisocyanate. The surface-coating film has the following properties:
Gloss: 82.
Pendulum hardness: 130 seconds.
Erichsen value: 3.8.
Cross-hatch test: 4.
Bending test: not satisfactory.

The coating exhibits substantially poorer flexibility and poorer adhesion.

EXAMPLE 6

A polyester was manufactured by conventional polycondensation of 11.7 moles of adipic acid, 6.3 moles of phthalic anhydride, 18 moles of ethylene glycol and 9 moles of trimethylolpropane. It has a hydroxyl number of 324, an acid number of 3.2 and a viscosity of 310 mPas at 75° C.

70 parts of this polyester are milled with 141,6 parts of titanium dioxide. 31 parts of the melamine/formaldehyde resin described in Example 1, 41.6 parts of the polyisocyanate described in Example 1, 40 parts of ethylglycol acetate and 2.5% (based on the melamine resin) of p-toluenesulfonic acid are then added.

A surface-coating solution having a flow time of 63 seconds and a solids content of 82.5% is obtained. A 77 μ thick surface-coating film is produced by baking for half an hour at 130° C. It has the following properties:
Gloss: 93.
Levelling: good.
Pendulum hardness: 138 seconds.
Cross-hatch test: 0.
Erichsen value: 6.3.
Bending test and scratch resistance: satisfactory.

EXAMPLE 7

An acrylate resin is manufactured by solution polymerization of 23% of hydroxypropyl acrylate, 45% of styrene and 32% of n-butyl acrylate. The resin, in the form of a 75% strength solution in ethylglycol acetate, has a K value of 16.5, a hydroxyl number of 100 (based on solid resin) and a viscosity of 2,200 mPas at 50° C.

30.0 parts of a solvent-free, methanol-etherified melamine/formaldehyde resin, 5.6 parts of the polyisocyanate described in Example 1, 20 parts of ethylglycol acetate and 0.2% (based on melamine/formaldehyde resin) of p-toluenesulfonic acid are added to 70 parts of the 75% strength acrylate resin. The surface-coating solution has a viscosity of 99 seconds in a DIN cup No. 4 and a solids content of 70%. A very glossy surface-coating film 35 μ thick was produced by baking for half an hour at 140° C. It has the following properties:
Pendulum hardness: 165 seconds.
Erichsen value: 9.4.
Cross-hatch test: 0.
Bending test and scratch resistance: satisfactory.

EXAMPLE 8

An acrylate resin consisting of 23% of hydroxypropyl acrylate, 35% of styrene, 36% of n-butyl acrylate, 5% of ethylhexyl acrylate and 1% of acrylic acid is manufactured by solution polymerization in ethylglycol acetate. Solids content: 75%, K value 16; viscosity 1,700 mPas at 50° C. Hydroxyl number: 100. (Preparation of the surface-coating solution:)

30 parts of a solvent-free methanol-etherified melamine/formaldehyde resin, 5.5 parts of tris-(isocyanatohexyl)-biuret (having an isocyanate content of 23.5%), 24.3 parts of ethylglycol acetate and 0.4 part (based on melamine/formaldehyde resin) of p-toluenesulfonic acid are added to 93.0 parts of the acrylate resin.

The surface-coating solution has a viscosity of 95 seconds in a DIN cup No. 4 and a solids content of 70%.

A very glossy surface-coating film 38 μ thick was produced by heating for half an hour at 130° C. It has the following properties:
Pendulum hardness: 137 seconds.
Erichsen value: 8.2.
Cross-hatch test: 0.
Bending test: satisfactory.

We claim:
1. A baking finish which comprises a reaction mixture of
   (A) from 40 to 85% by weight of hydroxyl-containing polymers,
   (B) from 10 to 55% by weight of amine/formaldehyde resins, and
   (C) from 5 to 35% by weight of at least one aliphatic or cycloaliphatic polyisocyanate selected from the group consisting of tris-(isocyanatohexyl)-biuret, tris-(isocyanatohexyl)-isocyanurate, bis-(isocyanatohexyl)-uretdione and the biuret groups-containing reaction product of hexamethylenediisocyanate with 3,3'-dimethyl-4,4'-diaminodicyclohexylmethane, the sum of the above percentages being 100, and the viscosity of the baking finish of low solvent content being from 20 to 300 DIN seconds, measured in a DIN cup No. 4.

2. A baking finish as claimed in claim 1, which contains, in addition to said reaction mixture, up to 15% by weight based on the sum of A, B and C of one or more monohydric or dihydric alcohols (D) having a boiling point above 120° C.

3. A baking finish as claimed in claim 2, which contains, in addition to said reaction mixture, up to 35% by weight based on the sum of A, B and C of one or more solvents (E) which dissolves the mixture of said components A, B and C.

4. A baking finish as claimed in claim 3, which contains, in addition to said reaction mixture, up to 65% by weight based on the sum of A, B and C of pigments and fillers (F).

5. A baking finish as claimed in claim 4, which contains, in addition to said reaction mixture, up to 3% by weight based on the sum of A, B and C of one or more crosslinking catalysts (G).

6. A baking finish as claimed in claim 5, which has a viscosity of from 30 to 100 DIN seconds, measured in a DIN cup No. 4.

7. A baking finish as claimed in claim 3, which contains, in addition to said reaction mixture, up to 3% by weight based on the sum of A, B and C of one or more esterification catalysts (G).

8. A baking finish as claimed in claim 2, which contains, in addition to said reaction mixture, up to 65% by weight based on the sum of A, B and C of pigments and fillers (F).

9. A baking finish as claimed in claim 2, which contains, in addition to said reaction mixture, up to 3% by weight based on the sum of A, B and C of one or more crosslinking catalysts (G).

10. A baking finish as claimed in claim 2, wherein the ratio of equivalents of hydroxyl groups of components (A) + (D) to isocyanate groups of component (C) is greater than 1.2 : 1.

11. A baking finish as claimed in claim 2, wherein the component (D) is a monohydric or dihydric aliphatic alcohol having a molecular weight less than 200.

12. A baking finish as claimed in claim 5, wherein the component (D) is an ester-diol which has a molecular weight of from 204 to 500 and which contains one ester group and two hydroxyl groups.

13. A baking finish as claimed in claim 1, which contains, in addition to said reaction mixture, up to 35% by weight based on the sum of A, B and C of one or more solvents (E) which dissolves the mixture of said components A, B and C, said solvent serving to lower the viscosity of said mixture.

14. A baking finish as claimed in claim 1, which contains, in addition to said reaction mixture, up to 65% by weight based on the sum of A, B and C of pigments and fillers (F).

15. A baking finish as claimed in claim 1, which contains, in addition to said reaction mixture, up to 3% by weight based on the sum of A, B and C of one or more crosslinking catalysts (G).

16. A baking finish as claimed in claim 1, wherein the component C is one or more derivatives of hexamethylenediisocyanate from the group comprising tris-(isocyanatohexyl)-biuret, tris-(isocyanathohexyl)-isocyanurate and bis-(isocyanatohexyl)-uretdione.

17. A baking finish as claimed in claim 1, wherein the component C is a polyisocyanate, containing biuret groups, which has been manufactured by reacting hexamethylenediisocyanate with 3,3'-dimethyl-4,4'-(diaminodicyclohexylmethane.)

18. A baking finish as claimed in claim 1, wherein the polymers of component (A) have hydroxyl numbers of from 60 to 400.

19. A baking finish as claimed in claim 1, wherein the polymers of component (A) have hydroxyl numbers of from 80 to 300.

20. A baking finish as claimed in claim 1, wherein the component (A) is an acrylate resin having a molecular weight of from 1,000 to 3,000.

21. A baking finish as claimed in claim 20, wherein the acrylate resin is a copolymer of a) from 10 to 90% by weight of an ester of acrylic acid or methacrylic acid with a monohydric aliphatic alcohol of 1 to 8 carbon atoms and b) from 10 to 50% by weight of a monoester of acrylic acid or methacrylic acid with an aliphatic polyhydric alcohol of 2 to 8 carbon atoms which may also contain up to 60% by weight of a vinyl-aromatic or isopropenyl-aromatic of 8 to 14 carbon atoms, and up to 20% by weight of other olefinically unsaturated monomers, as copolymerized units.

22. A baking finish as claimed in claim 1, wherein the component (A) is a hydroxyl-containing polyester having a molecular weight of from 250 to 1,000.

23. A baking finish as claimed in claim 22, wherein the hydroxyl-containing polyester has been manufactured from saturated dicarboxylic acids or their esterifiable derivatives and aliphatic dihydric alcohols, and the dihydric alcohols may be replaced, at least in part, by trihydric to pentahydric alcohols.

24. A baking finish as claimed in claim 1, wherein the component (B) is an at least partially etherified precondensate of formaldehyde and melamine or urea.

25. A baking finish as claimed in claim 24, wherein the component (B) is fluid at room temperature.

26. The baking finish of claim 1 wherein said finish has been cured on a base by heating to a temperature of from about 80° to 180° C.

* * * * *

UNITED STATES PATENT AND TRADEMARK OFFICE
CERTIFICATE OF CORRECTION

PATENT NO. : 4,102,847
DATED : July 25, 1978
INVENTOR(S) : HARTMANN ET AL

It is certified that error appears in the above-identified patent and that said Letters Patent are hereby corrected as shown below:

In claim 1, line 10 (column 8, line 37) cancel "thohexyl)-uretdione" and substitute --tohexyl)-uretdione--.

Claim 12, line 1 (column 9, line 16) cancel "5" and substitute --2--.

Claim 16, line 4 (column 9, line 37) cancel "tris-(isocyanathohexyl)-" and substitute --tris(isocyanatohexyl)- --.

Claim 17, last line (column 10, line 2) cancel "(diaminodicyclohexylmethane.)" and substitute --diaminodicyclohexylmethane.--

*Signed and Sealed this*

*Twenty-fourth* Day of *April 1979*

[SEAL]

*Attest:*

RUTH C. MASON
*Attesting Officer*

DONALD W. BANNER
*Commissioner of Patents and Trademarks*